US010512993B2

United States Patent
Zito et al.

(10) Patent No.: US 10,512,993 B2
(45) Date of Patent: *Dec. 24, 2019

(54) PRODUCTION LINE (71) Applicant: Comau S.p.A., Grugliasco (Turin) (IT)

(72) Inventors: Giovanni Zito, Grugliasco (IT); Michele Giusto, Grugliasco (IT); Amleto Petrone, Grugliasco (IT); Ermanno Faccin, Grugliasco (IT); Ugo Ghirardi, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 256 days.

This patent is subject to a terminal disclaimer.

(21) Appl. No.: 15/583,276

(22) Filed: May 1, 2017

(65) Prior Publication Data
US 2017/0320176 A1    Nov. 9, 2017

(30) Foreign Application Priority Data
May 3, 2016   (EP) .................................... 16168061

(51) Int. Cl.
*B23P 21/00*    (2006.01)
*B23P 19/00*    (2006.01)
*B65G 19/02*    (2006.01)
*B65G 43/00*    (2006.01)

(52) U.S. Cl.
CPC ........... *B23P 21/008* (2013.01); *B23P 19/008* (2013.01); *B65G 43/00* (2013.01); *B65G 19/02* (2013.01)

(58) Field of Classification Search
CPC ..... B23P 21/008; B23P 21/004; B23P 19/001; B23P 19/008; B65G 43/00; B65G 17/002; B65G 19/02
See application file for complete search history.

(56) References Cited

U.S. PATENT DOCUMENTS

| 8,136,652 B2* | 3/2012 | Hinderer ................ B23P 21/00 |
| | | 198/345.3 |
| 2018/0214998 A1* | 8/2018 | Belardinelli ........... B65G 43/08 |
| 2018/0215541 A1* | 8/2018 | Belardinelli ......... A47B 49/002 |

FOREIGN PATENT DOCUMENTS

| DE | 102006061423 A1 | 6/2008 |
| JP | S4945270 A | 4/1974 |
| JP | S4956376 A | 5/1974 |
| JP | 2006320990 A | 11/2006 |
| JP | 2011207615 A | 10/2011 |
| JP | 2012196752 A | 10/2012 |

* cited by examiner

Primary Examiner — John C Hong
(74) Attorney, Agent, or Firm — Young Basile Hanlon & MacFarlane, P.C.

(57) ABSTRACT

A production line including a chain conveyor for moving part transporting pallets through an electronically controlled workstation. The workstation includes an implement for use by a workstation user which is freely movable along the transport direction of the pallets within the workstation. The workstation may further include a plurality of automated drawers containing components for manual assembly operations in the workstation. The chain conveyor includes front hook and rear hook units to engage the pallet for movement along the production line. When the pallet is prevented from further movement by an obstacle, the chain rear hook moves from a pallet engaged position to a position whereby an optical beam is interrupted. On interruption of the optical beam, a command signal is generated which causes the conveyor to stop.

12 Claims, 13 Drawing Sheets

PRODUCTION LINE

FIELD OF THE INVENTION

The present invention relates to production lines, in particular production lines comprising:
- at least one assembling station,
- a chain conveyor device comprising a chain for transporting a plurality of pallets along said production line, wherein each pallet is provided for transporting parts to be assembled,
- motor means for moving said chain,
- an electronic control system,
- said motor means and said electronic control system being configured for causing said chain-transported pallets to proceed with a continuous movement through said at least one assembling station.

OBJECT OF THE INVENTION

In production lines of continuous moving type, parts or basic components are transported by pallets which proceed without stops along a conveyor line through a sequence of assembling stations, wherein further parts and components are sequentially assembled on the part or basic component carried by each pallet.

In production lines of the type indicated above, assembling operations are manually executed by operators, sometimes with the aid of automated systems. In this type of lines there is the need of improving the production efficiency and in particular of enabling the assembling operations which are to be executed by the operators to be as easy and fast as possible, while at the same time ensuring that the assembling operations are executed completely and correctly and with a high level of safety for the operators.

The main object of this invention is to satisfy the afore-mentioned requirements in the best possible manner.

An equally important object of the invention is to provide a production line which ensures that the assembling status of the parts is constantly monitored and that the assembling operations are correctly executed.

A further object of the present invention is to provide a simple production line which can be easily integrated in any sections of the layout of a production environment.

A further object is to provide a production line adapted for assembling parts of different types and sizes.

A last but not less important object is to provide a production line which is ergonomic for the operators which interact with the automated systems of the line, so as to increase productivity and to ensure that the way of working of the operators be as least as possible affected by physical stress.

SUMMARY OF THE INVENTION

In view of achieving the above indicated objects, the invention is directed to a production line having all the features which have been indicated at the beginning of the present description and further characterized in that:
- an implement is associated to said at least one assembling station, wherein said implement is guided on a support structure in such a way as to be freely movable along the transport direction of the pallets, whereby said implement can be used by an operator dedicated to the assembling station in order to execute manual assembly operations on the parts transported by each pallet, said implement thus being adapted to be pulled by the operator while the operator follows the pallet in its continuous movement through the assembling station, for executing said manual operations,
- in association to each pallet, said chain is provided with a front hook unit and a rear hook unit which are longitudinally spaced from each other and adapted to engage the pallet for locating the pallet relative to said chain and for causing the pallet to advance along with the chain,
- said rear hook unit being adapted to release the pallet when an obstacle prevents the pallet from proceeding along with the chain, said rear hook unit being also adapted to move, in this condition, to an optical beam interception position, in which a first interception element which is part of the rear hook unit intercepts a first optical beam emitted by a first optical sensor,
- said electronic control system being programmed for generating a command signal when said first optical beam is intercepted by said first interception element.

In a preferred embodiment, said command signal causes a stop of the chain conveyor device.

Preferably, an automatic system of assistance for the operator is associated to each assembling station, comprising a plurality of automated drawers provided for containing components to be used for assembling of said parts transported by the pallets.

Moreover, according to a further characteristic of the invention, a human machine interface is associated to each assembling station, said human machine interface is supported in a position which is accessible by the operator during the assembling operations.

In the afore-mentioned preferred embodiment, the rear hook unit comprises also a second interception element which, in the afore mentioned interception position of the rear hook unit, intercepts a second optical beam emitted by a second optical sensor, whose signal is used by the electronic control system for identifying the rear hook unit which is moved away from the pallet engaging position.

Furthermore, in this preferred embodiment, the implement used by the operator is carried by a slide which is freely slidably mounted along the transport direction of the pallets on a bearing structure mounted adjacent to said chain conveyor device, said implement having a structure including a sequence of elements which are movably mounted one relative to each other, according to different degrees of freedom, the last element of this sequence carrying a tool.

Thanks to the afore-mentioned features, the production line according to the invention achieves a series of important objects simultaneously. Firstly, the invention provides the immediate reporting of any obstacle or obstruction along the line and preferably also the immediate identification of the point of the conveyor chain in which a problem has occurred, thereby ensuring a correct operation of the line and safety for the operator.

During the execution of the manual assembly operations, the operator walks at the side of the line following a certain pallet in its continuous movement. During the execution of such operations, the operator uses the implement which is freely movable in a direction which is parallel to the line. The movement of the implement along the line is not motorized, and it is the operator himself who grips the implement and causes it to move in synchronism with the movement of the operator at the side of the pallet. All the afore-mentioned features render the way of working of the operator easy and efficient. The operator is further assisted by the system of automated drawers containing components to be used for assembling.

During the operations, the electronic control system recognizes at each instant the position of each pallet and of the implement used by the operator. This latter interacts with the control system by means of the human machine interface, which is supported at a position which is comfortably accessible by the operator during the assembly operations. In the preferred embodiment, the human machine interface is configured for example for indicating to the operator the correct sequence of operations to be completed on the basic parts; for confirming to the operator the correct execution of the executed individual operations (for example the tightening torque of a threaded connection); for receiving an input by the operator about the correct execution of an individual operation. Preferably the human machine interface is of the touch-screen type.

DETAILED DESCRIPTION OF A PREFERRED EMBODIMENT

Further features and advantages of the invention will become apparent from the following description with reference to the annexed features, given purely by way of non limiting example, in which.

In the following description various specific details are illustrated, aimed to a better understanding of the embodiments. The embodiments can be implemented without one or more of the specific details, or with other methods, components, or materials, etc. In other cases, structures, materials or known-operations are not shown or described in detail in order to avoid that various aspects of the embodiment may become obscure.

The references herein used are only for convenience and therefore do not define the extent of the protection or the scope of the embodiments.

Figure 1:
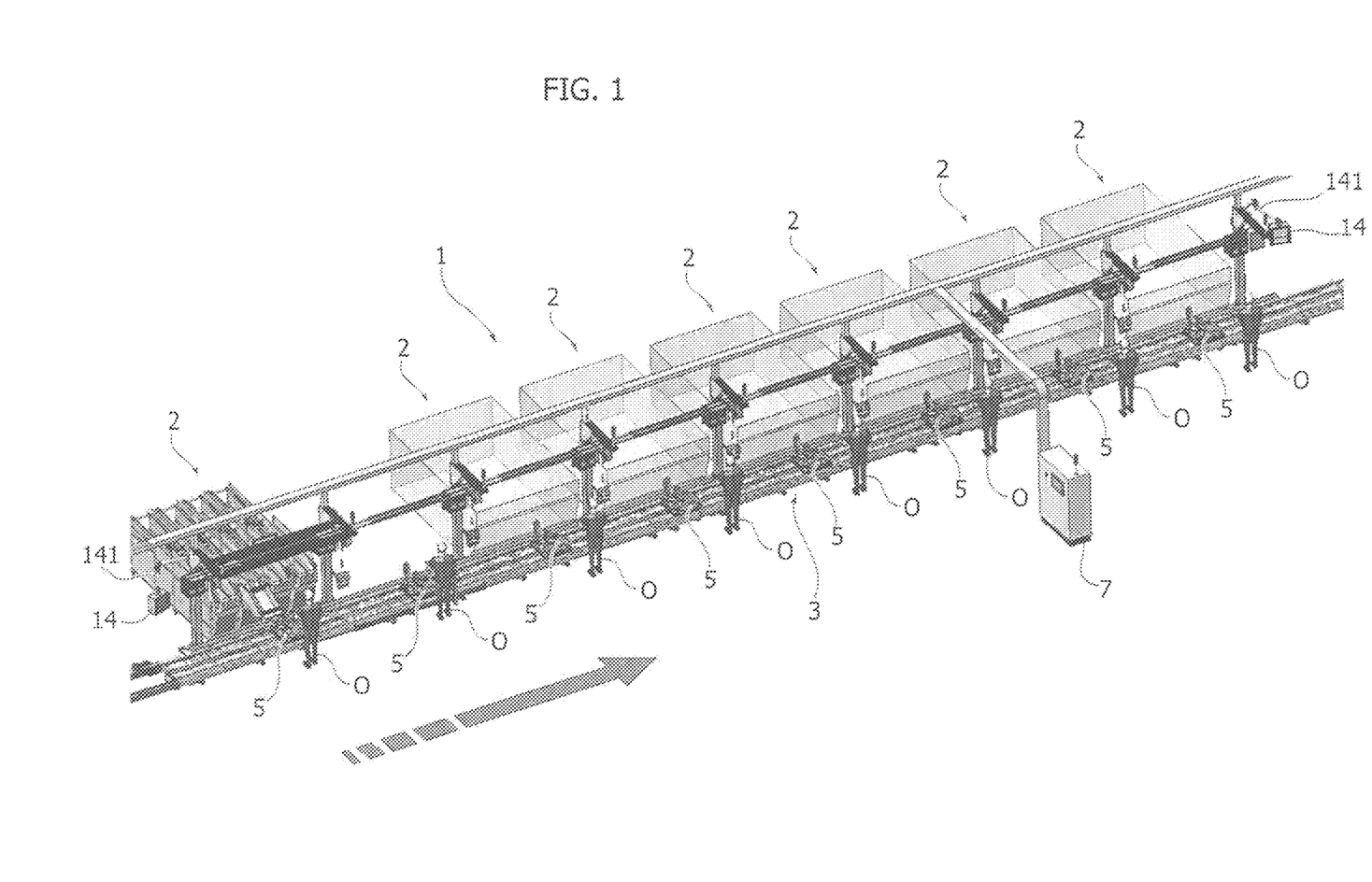
FIG. 1 is a perspective view of an embodiment of the production line according to the invention.

With reference to FIG. 1, the number 1 generally indicates a production line of the continuous movement type, comprising a plurality of assembling stations 2 located in series relative to each other, wherein at each assembling station 2 an operator O is dedicated. The production line according to the present invention can also be provided with only one assembling station 2.

The line 1 according to the invention further comprises a chain conveyor device 3 mounted adjacent to the assembling stations and provided for enabling transport of a plurality of pallets 5 along the line 1. Each pallet 5 is provided for example for carrying a basic part (such as a cylinder head) on which the operator O manually assembles further components.

In an actual embodiment of the production line according to the invention, the pallet 5 is provided in conformity to what is illustrated in the patent application EP15153558 of the same assignee.

As illustrated in the drawings and as previously indicated, at each of the afore-mentioned assembling stations 2 an operator O is dedicated which operates on the parts transported by the pallets 5 which continuously move in front of the operator. Each operator operates on all the pallets which pass through the assembling station 2 controlled by the operator. For each pallet which moves with continuous movement through the station, the operator executes all the required assembling operations on the transported part, while the operator moves at the side of the line in such a way as to follow the pallet during its movement. If all the manual operations are executed in a correct way and within a correct time, the basic part carried by the pallet has all the additional components correctly mounted thereon when the continuously moving pallet goes out from the afore-mentioned assembling station. If downstream of said assembling station at least one further assembling station is provided, a further operator is dedicated thereto, who executes further assembly operations, and the same is true for any additional stations downstream of the previous stations.

Again with reference to FIG. 1, the reference number 7 indicates an electronic control system configured for controlling, inter alia, motor means (illustrated in the following) which drive a continuous movement of the chain conveyor device 3 and hence of the pallet 5, at a required, substantially constant, speed.

Figure 2A:
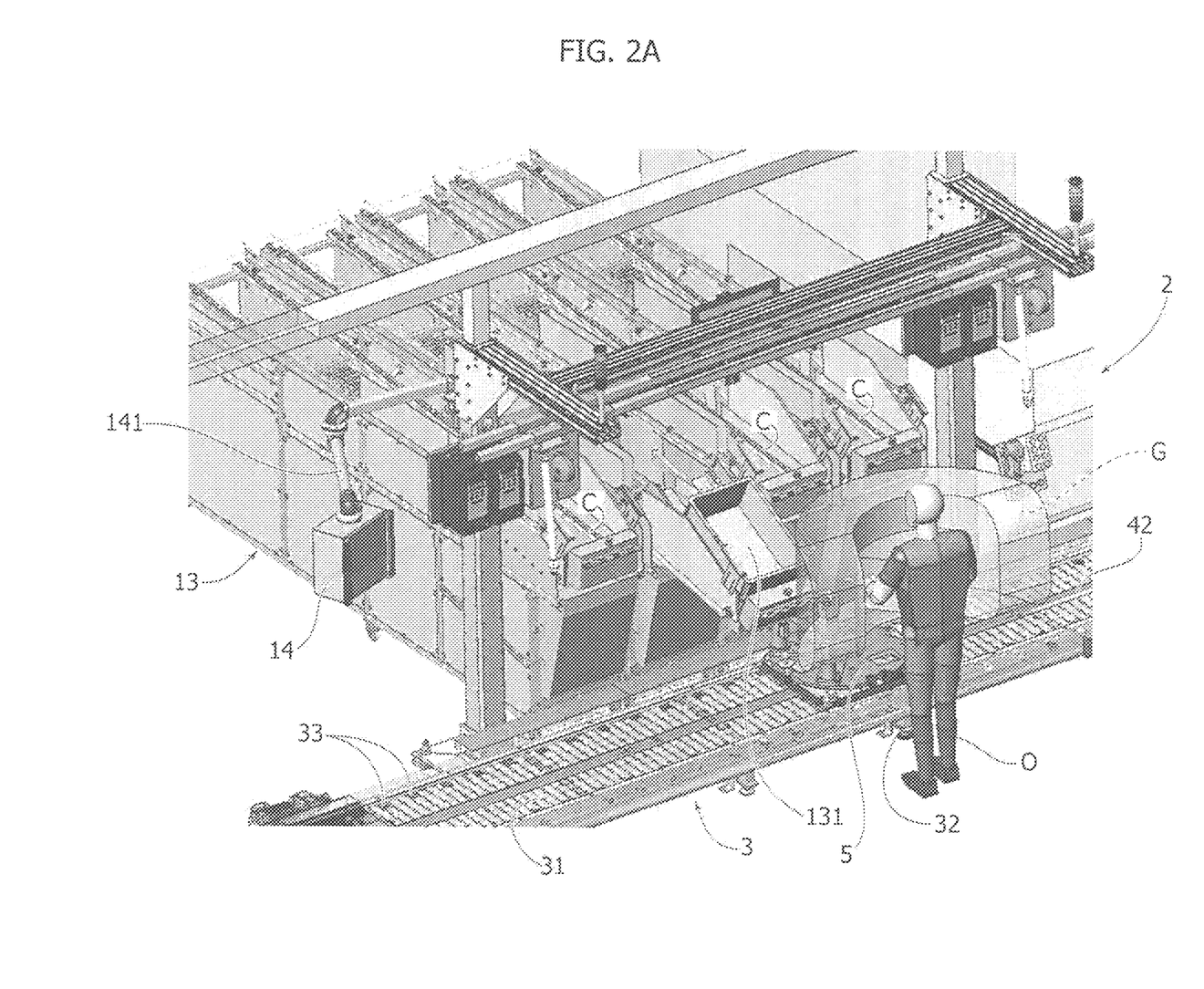
FIGS. 2A-2B are different perspective views at an enlarged scale of an assembling station illustrated in the FIG. 1.
Figure 2B:
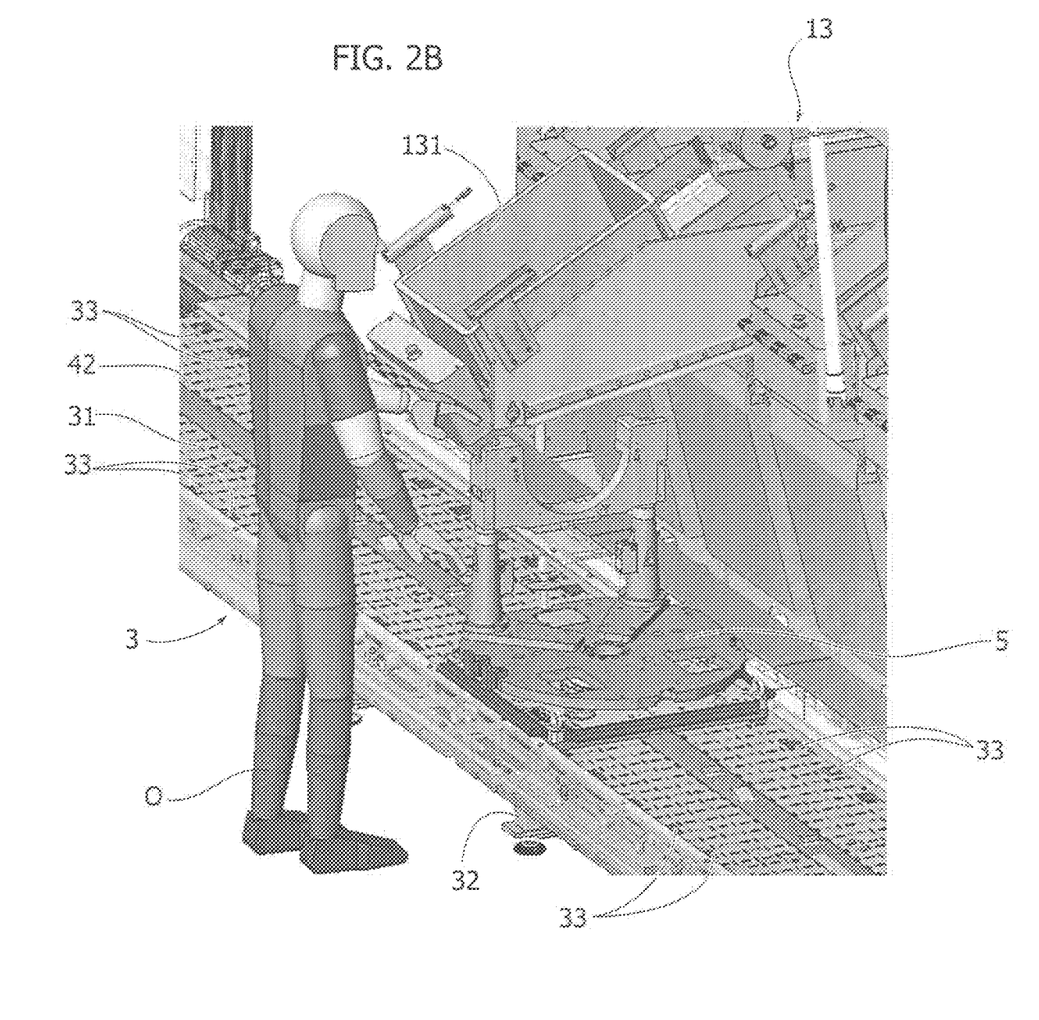

FIGS. 2A, 2B are two detailed perspective views of one assembling station 2 illustrated in FIG. 1. To each assembling station 2 there is associated an automatic system 13 for assistance to the operator O, which comprises a series of automated drawers 131. The automatic drawers 131 are provided for containing components (such as bolts) to be used for the assembling on the basic parts transported by the pallets 5. The drawers 131 are provided so as to be displaceable by means of a transport system driven by chains C at the automatic assistance system 13 in a direction which is perpendicular to the chain conveyor device 3. The drawers 131 are displaceable along this direction between a retracted supply position, spaced apart from the operator O, in which the components required for the assembly can be added into the drawers 131, and a forwardly advanced position, slightly inclined towards the operator O, where they are easily reachable by the operator O. Furthermore, the electronic control system 7 is programmed for sequentially displacing the drawers 131 of each automated assistance system 13 towards the advanced position in synchronism with the movement of the pallet 5 on the chain conveyor device 3. The advanced position of the drawers 131 is inclined towards the operator O, so that the operator O must not make an excessive effort for reaching the parts contained in each drawer 131 and for carrying-out the assembling operations. In FIG. 2A reference G designates the virtual working area of the operator O which is considered to be ergonomic for the operator O. The production line 1 according to the invention is adapted to increase the productivity level also thanks to the fact of ensuring a way of working to the operators O which is without physical stress.

Again with reference to FIGS. 2A-2B, a portion of the chain conveyor device 3 is also illustrated which transports the pallets 5 along the assembling stations 2. The device 3 comprises a support frame 32 which rests on the floor, a flat cover 31 and a plurality of freely rotatable rollers 33 provided at both sides of the cover 31 and acting as lateral supports for the pallets 5. The chain conveyor device 3 further comprises an endless chain 4 which will be illustrated more in detail in the following, this endless chain 4 being moved by motor means 6 which will be also described more in detail in the following of the present disclosure, so as to transport the pallets 5 along the chain conveyor device 3.

Again with reference to FIG. 2A, the automatic assistance system 13 comprises a human machine interface 14, preferably of the touch-screen type. The human machine interface 14 is movably mounted on a support frame 141, so as to be easily accessible by the operator O while the operator O follows the pallet and executes the assembling operations. In the embodiment here illustrated, the human machine interface 14 is configured for example in order to:

- indicate the correct sequence of operations to be executed on the basic parts to the operator O;
- confirm the correct execution of the executed individual operations to the operator O (such as the tightening torque of a threaded connection);
- receive an input by the operator O about the correct execution of an individual operation.

Figure 3:
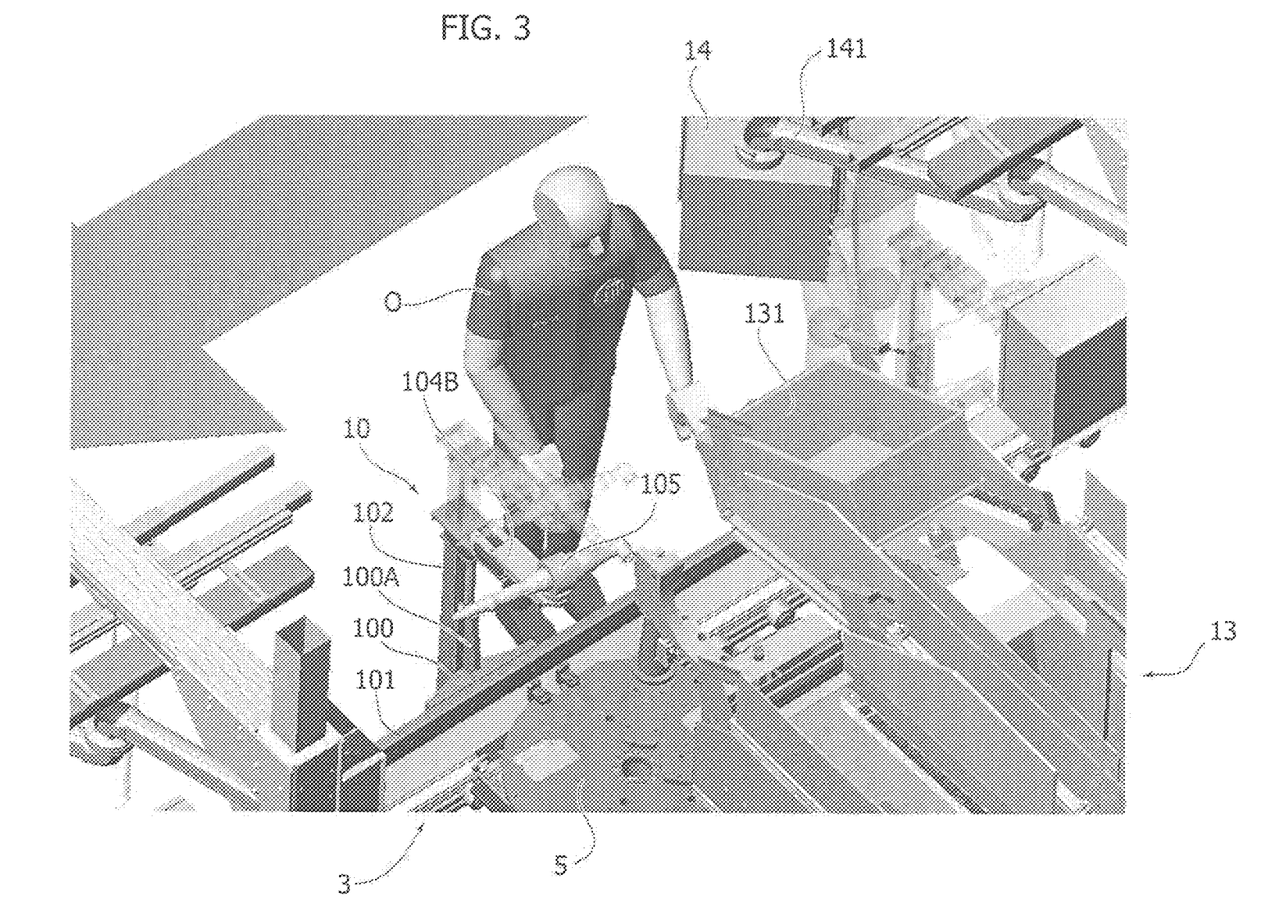
FIG. 3 is a top view of an operator which interacts with the automatic assistance system illustrated in FIG. 3, FIGS. 4A-4C show perspective views of a movable implement.
Figure 4A:
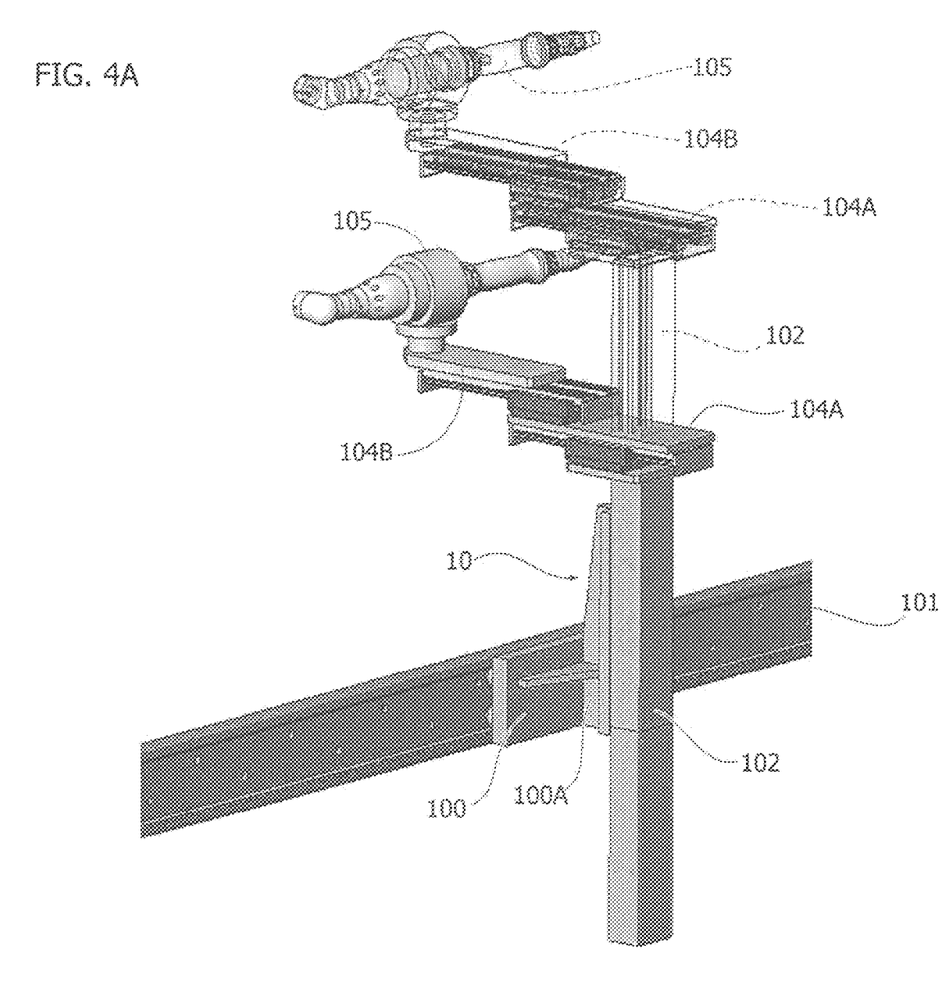
Figure 4B:
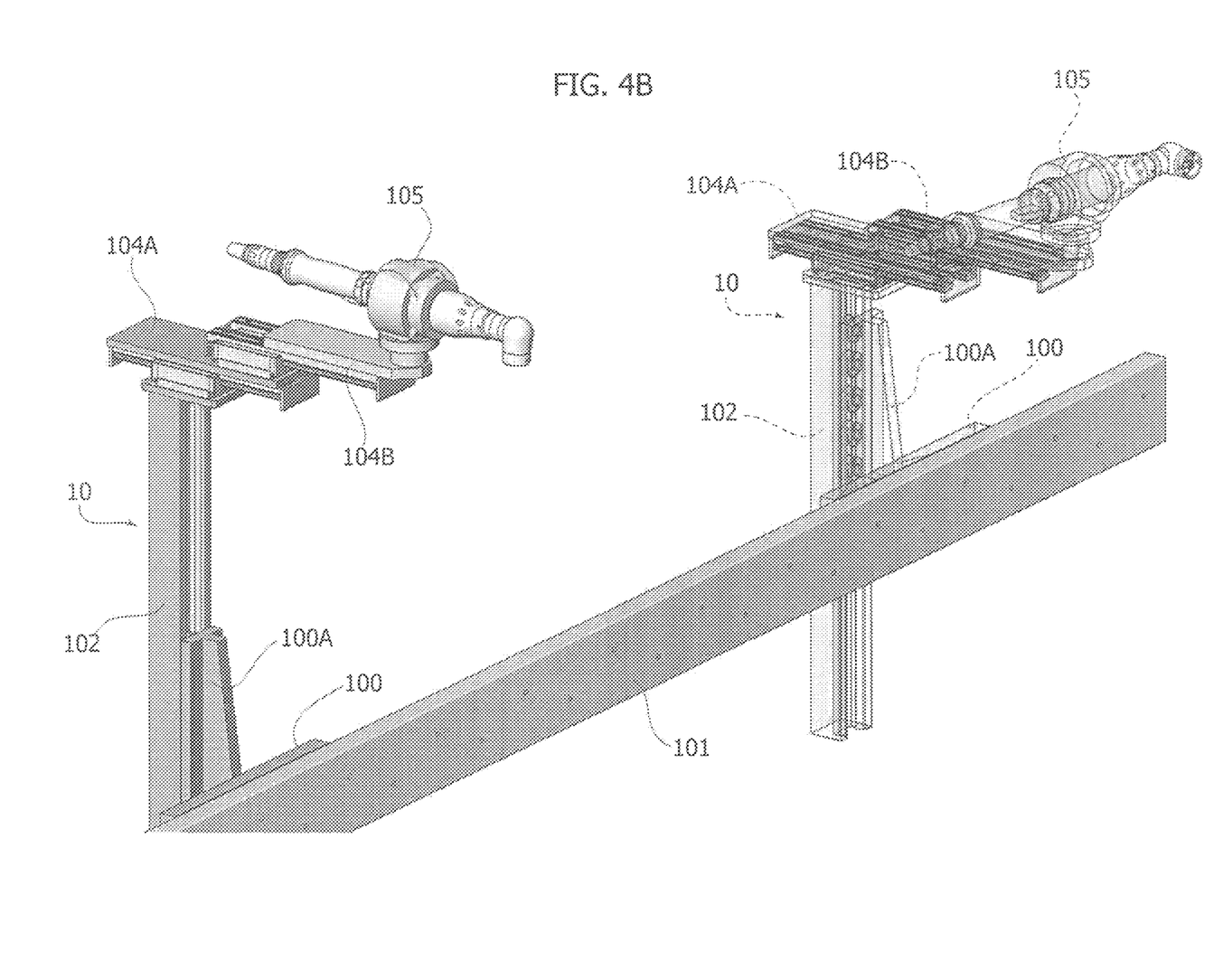
Figure 4C:
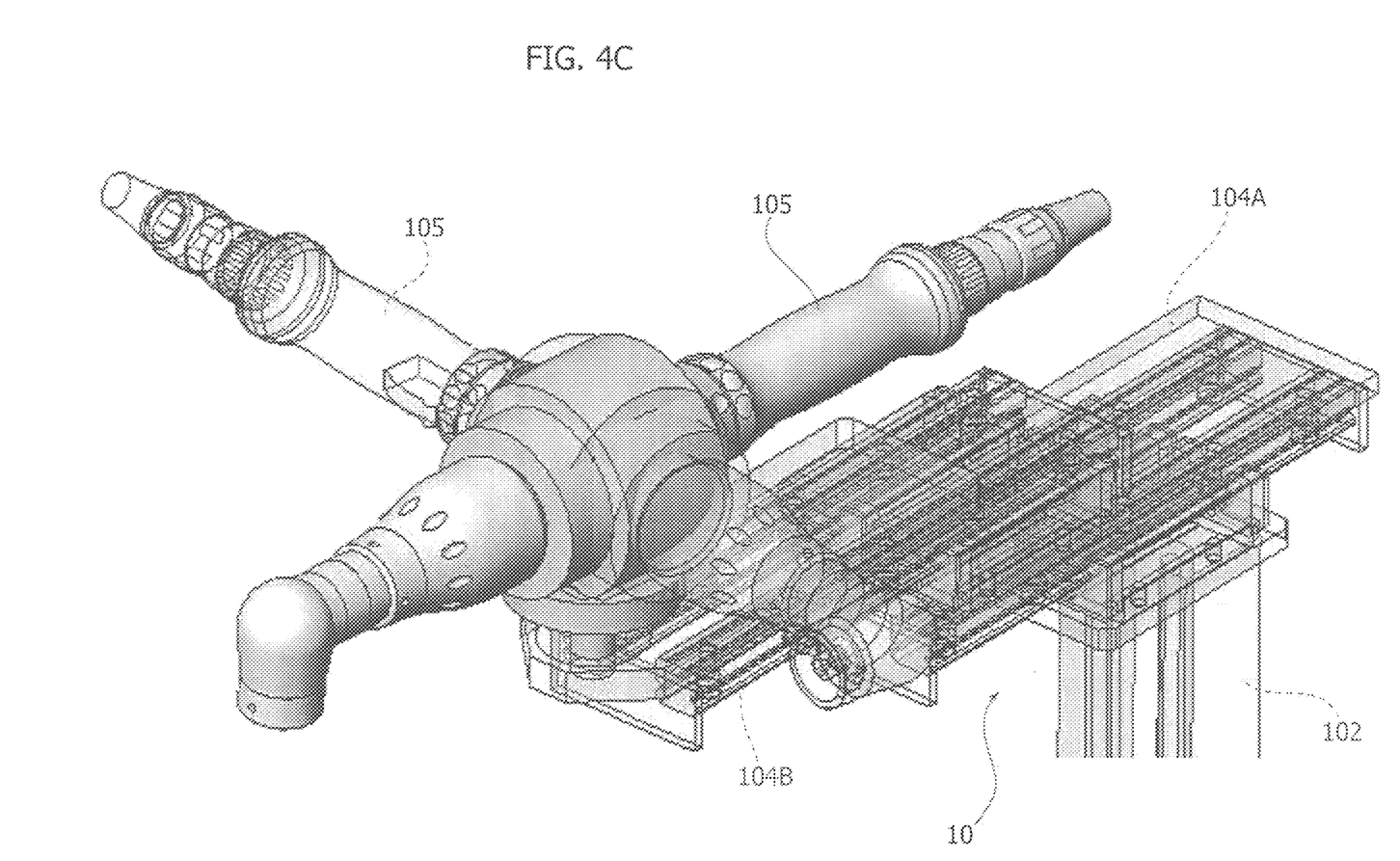

As illustrated in FIG. 3 and more in detail in FIGS. 4A-4C, to each assembling station 2 an implement 10 is also associated, which is used by the operator O for executing at least part of the manual assembling operations on the parts transported by the pallets 5.

The implement 10 is carried by a slide 100 which is freely slidably mounted along the transport direction of the pallets 5 on a bearing structure 101 mounted adjacent to the chain conveyor device 3. The structure of the implement 10 is constituted by a sequence of elements which are movably mounted one relative to each other, according to different degrees of freedom. The last element of this sequence carries an electric wrench 105, which is used by the operator for tightening connection elements such as screws or nuts during the assembly cycle. Naturally, the wrench 105 constitutes only an example of a tool which can be used. Furthermore, preferably this wrench is connected so as to be removable from the structure which supports the wrench, in such a way as to be quickly replaceable by a tool of a different type. Finally, the wrench itself comprises a motorized spindle which preferably can be coupled with tools of different types.

In the embodiment illustrated herein, the slide 100 carries a support 100A on which, at a position which is vertically adjustable, a beam element 102 is mounted, which extends in a vertical direction. The top of the beam element 102 supports a plate 104A which is freely slidable along a direction which is horizontal and also perpendicular to the longitudinal direction of the line. In the illustrated example, the plate 104A supports a plate 104B which is freely slidable also in the same sliding direction of the plate 104A. The above described arrangement is modular, and it is possible to provide a single slidable plate or any number of slidable plates located in cascade one from each other.

Returning to the illustrated example, the plate 104B carries the wrench 105 in an manner adjustable around a vertical axis (see FIG. 4C). The operator O can execute assembling operations on parts transported by pallets 5 by means of this wrench 105, while the operator follows the pallet moving continuously at constant speed. While the operator uses the wrench 105, this latter follows in synchronism the movement of the operator along the longitudinal direction of the line, thanks to the slidable support constituted by the slide 100. It is the operator himself who pulls the implement 10 along this direction during the assembling operations. The implement 10 makes also easy for the operator to position the wrench at different required positions, thanks to the height adjustment of the element 102 and to the possibility of the plates 104A, 104B to slide.

Thanks also to the above indicated features of the implement 10, the production line 1 according to the invention ensures assembling operations which are easy and quick in such a way as to make the execution of the assembling operations efficient.

During the normal operation of the line 1, each operator O pushes or pulls the implement 10 along the bearing structure 101 which is adjacent to the dedicated assembling station 2, thereby following the pallet 5 transported by the chain conveyor device 3 and operating on the parts carried by the pallet 5. At the end of the passage of the pallet 5 along the individual station 2, the operator O pushes the tool in the opposite direction, for repeating the assembly operations on the next pallet 5 passing through the individual station 2.

Each assembling station comprises a plurality of data storing electronic control units (not shown) provided for recording the assembling operations completed on each pallet 5. The electronic units are in communication with the electronic control system 7. Thanks to these features, the production line 1 is adapted for a constant monitoring of the assembling status of the parts ensuring also the correct execution of the assembling operations which are carried-out.

Figure 5:
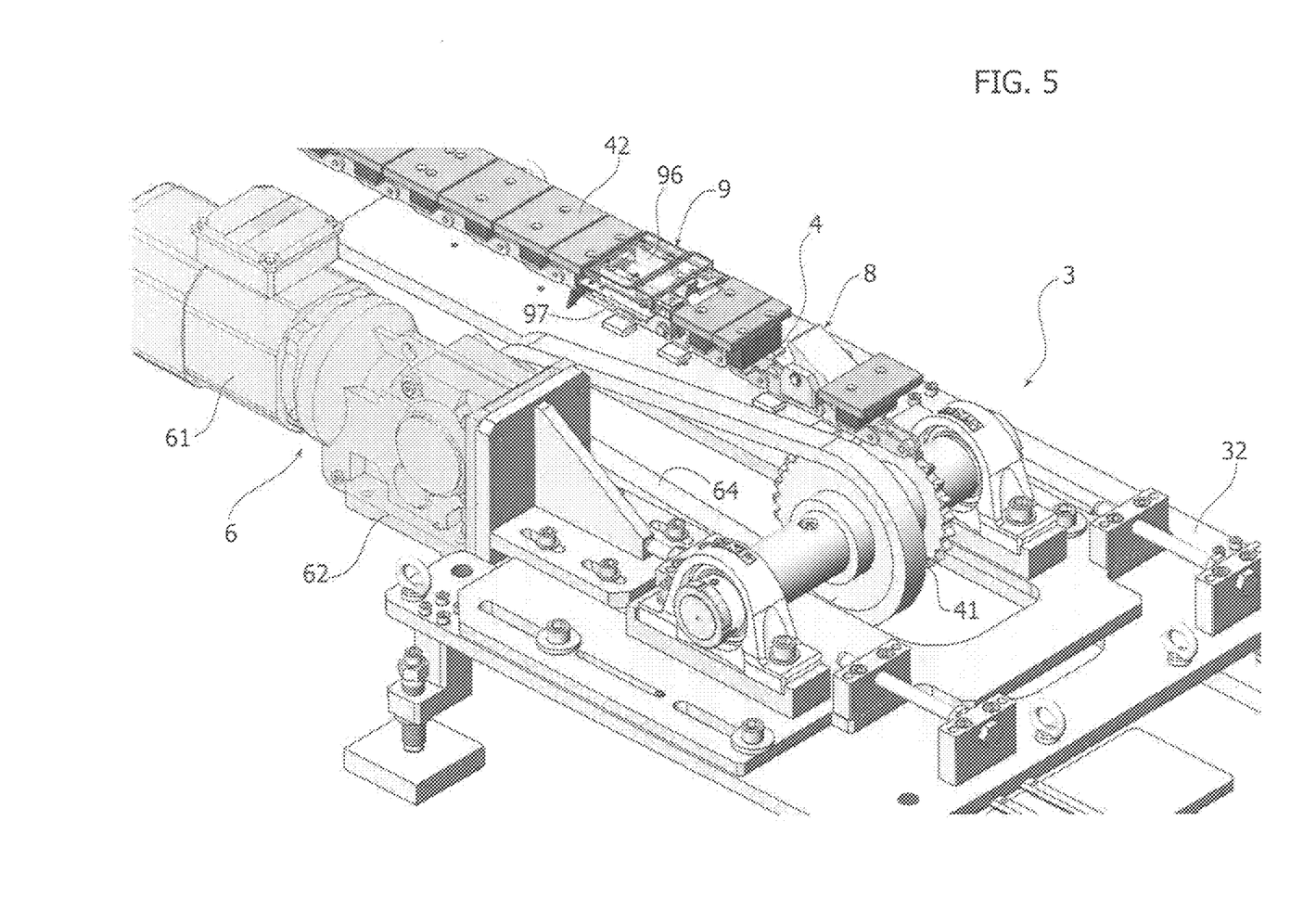
FIG. 5 is a perspective view of motor means of the production line according to the invention.

FIG. 5 shows a perspective view of motor means 6 provided for moving the chain 4 which is part of the chain conveyor device 3. In the present embodiment the motor means 6 comprise an electric motor 61 to which a reduction unit 62 is associated. The reduction unit 62 has an output shaft on which a belt 64 is mounted. The electric motor 61 and the reduction unit 62 are carried by the support structure 32 which is secured to the floor and which supports also the chain conveyor device 3 and the chain 4.

As previously indicated, the chain conveyor device 3 comprises the endless chain 4, which is engaged around two toothed wheels 41, each mounted at the opposite ends of the chain conveyor device 3. The closed loop chain 4 has an upper active chain run and a lower passive chain run. The upper chain run is active and covered by a set of plates 42, which are fixed relative to the chain 4 moved by the motor means 6.

With reference to FIGS. 5-9, the chain 4 is provided by a set of front hook units 8 and a set of rear hook units 9. In particular with reference to the cross-sectional view of FIG. 7, one front hook unit 8 and one rear hook unit 9 are spaced from each other in such a way that they can both engage a same pallet 5 transported by the chain 4 which, as previously indicated, is moved by the motor means 6. The hook units 8, 9 and the lateral rollers 33 are the elements on which the pallets 5 rest during their movement along the chain conveyor device 3.

Figure 7:
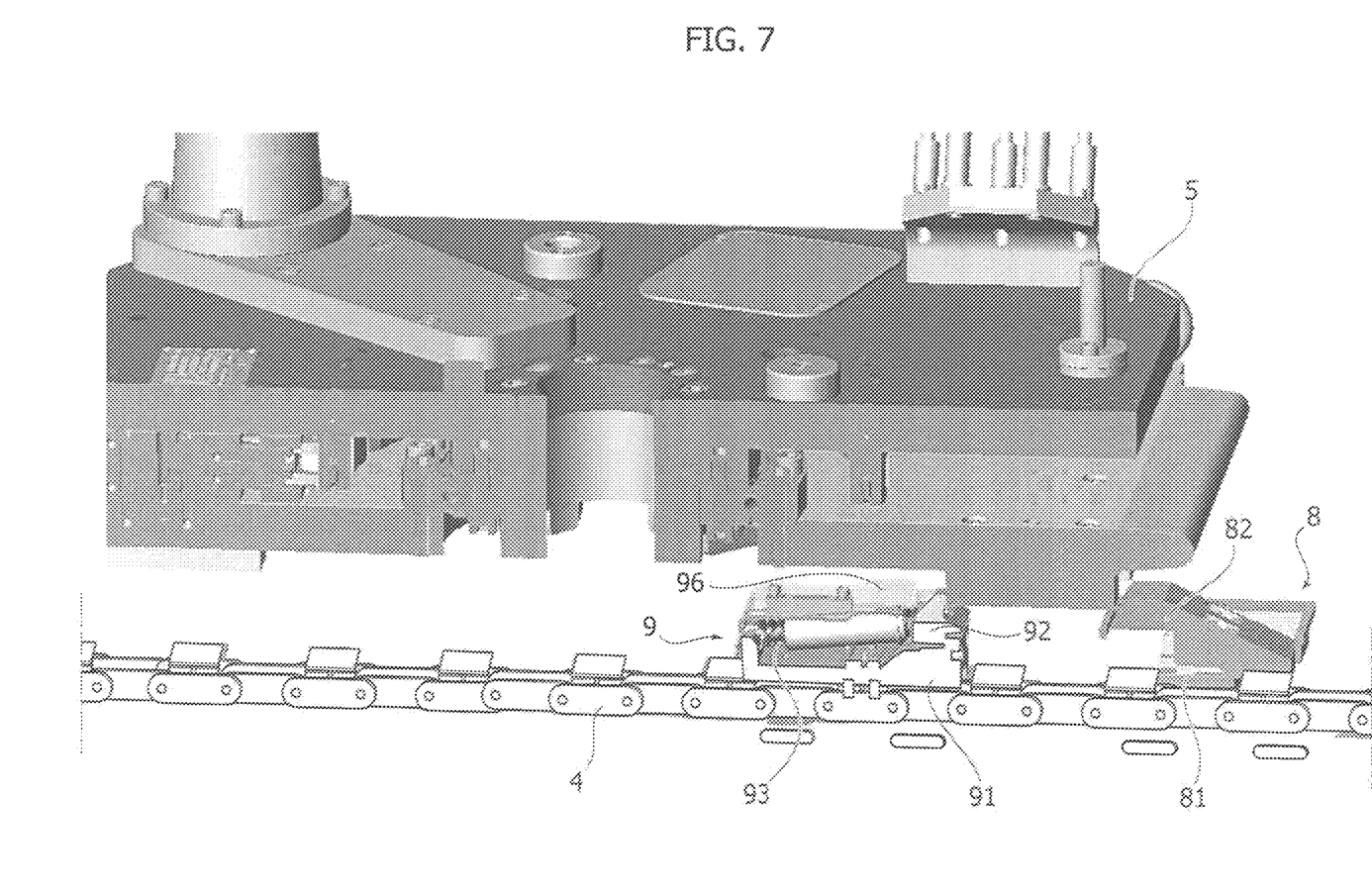
FIG. 7 is a cross sectional view of a pallet transported by the production line according to the invention.

In particular with reference to FIG. 7, each front hook unit 8 has a support bracket 81 rigidly connected to the chain 4 and a hook 82 mounted on the support bracket 81. The front hook units 8 are provided for locating the pallet 5 relative to said chain 4.

Figure 6A:
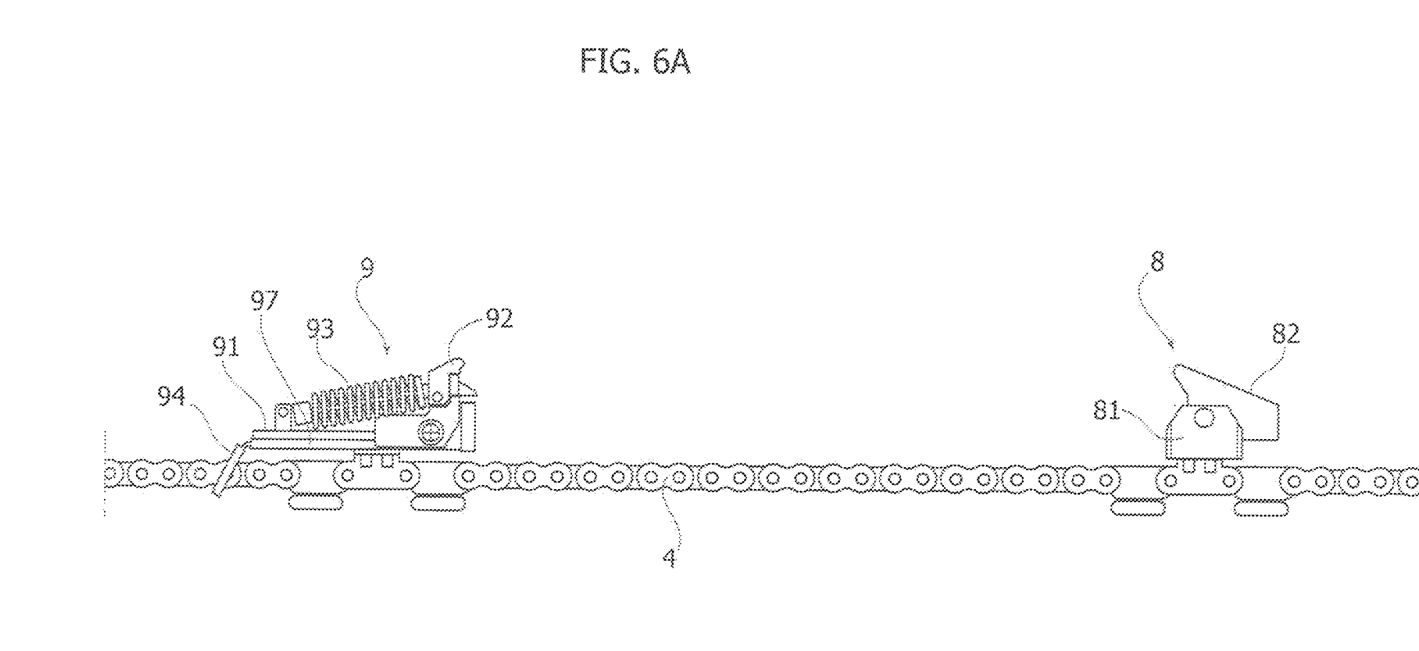
FIGS. 6A-6B show lateral views of hook units of the pallets respectively in two different operative configurations.

Also each of the rear hook unit 9 comprises a support bracket 91 rigidly connected to the chain 4 and a hook 92 which is pivotally mounted on the support bracket 91 around an axis which is transverse to the longitudinal direction of the chain 4. Each rear hook unit 9 comprises also a spring 93 which biases the hook 92 towards an engaging position of the individual pallet 5 (shown in FIG. 6A). The rear hook unit 9 has also a cover 96 provided for covering the spring 93. The rear hook units 9 are provided for pushing the pallets 5 along the chain 4 of the conveyor device 3.

In FIG. 7 the operative configuration of the hook units 8, 9 is illustrated in which an individual pallet 5 is engaged by such units 8, 9.

Figure 6B:
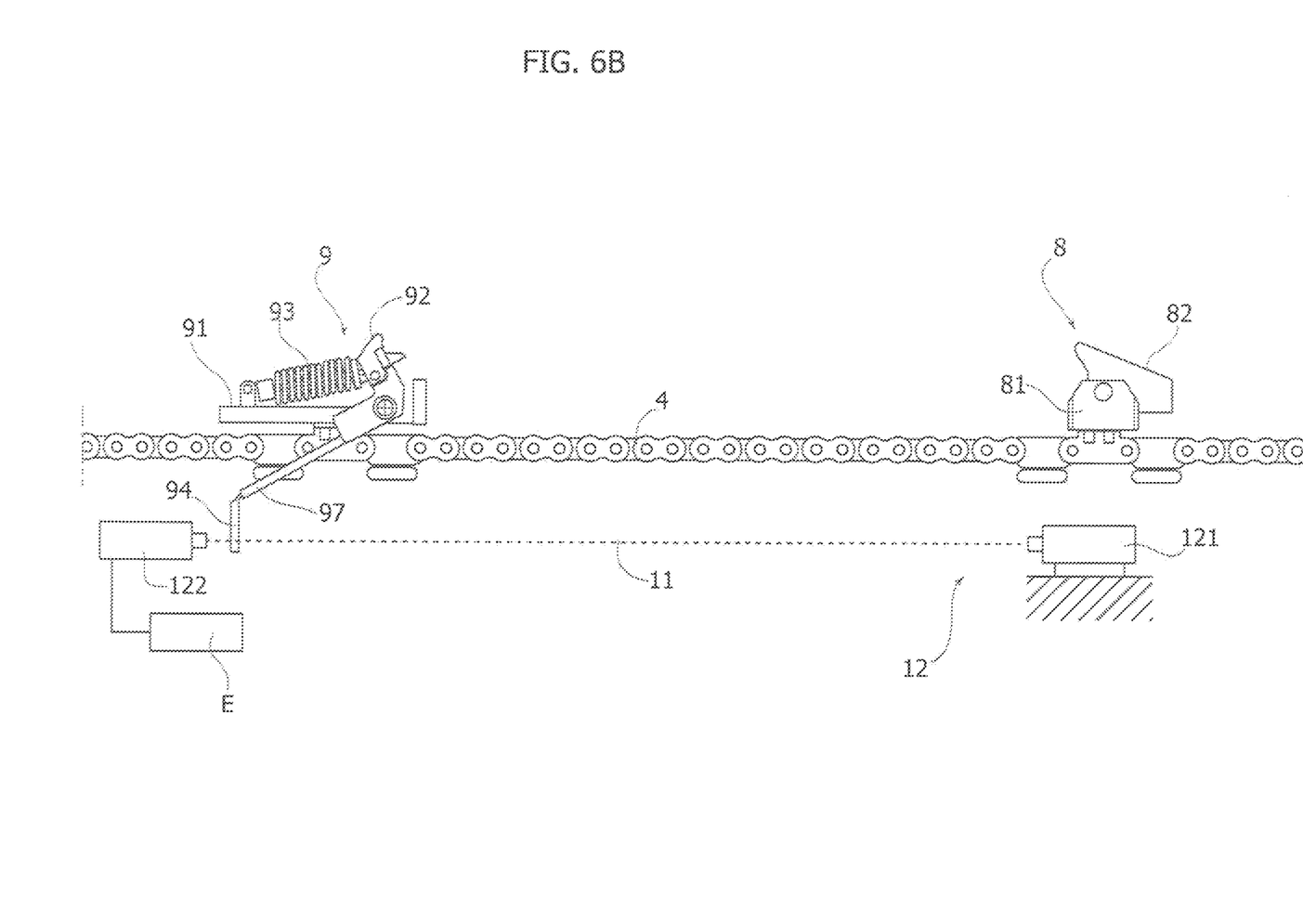
Figure 6C:
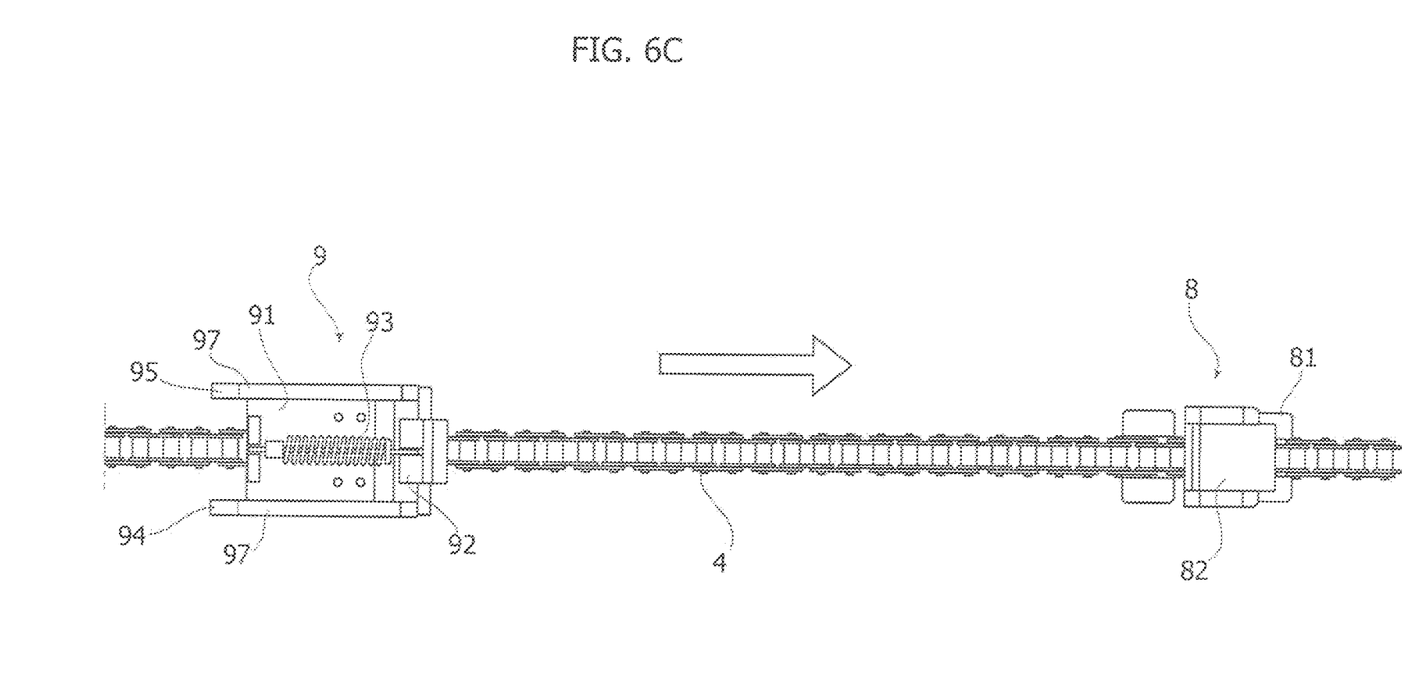
FIG. 6C shows a top view of the same parts illustrated in FIGS. 6A-6B.
Figure 8:
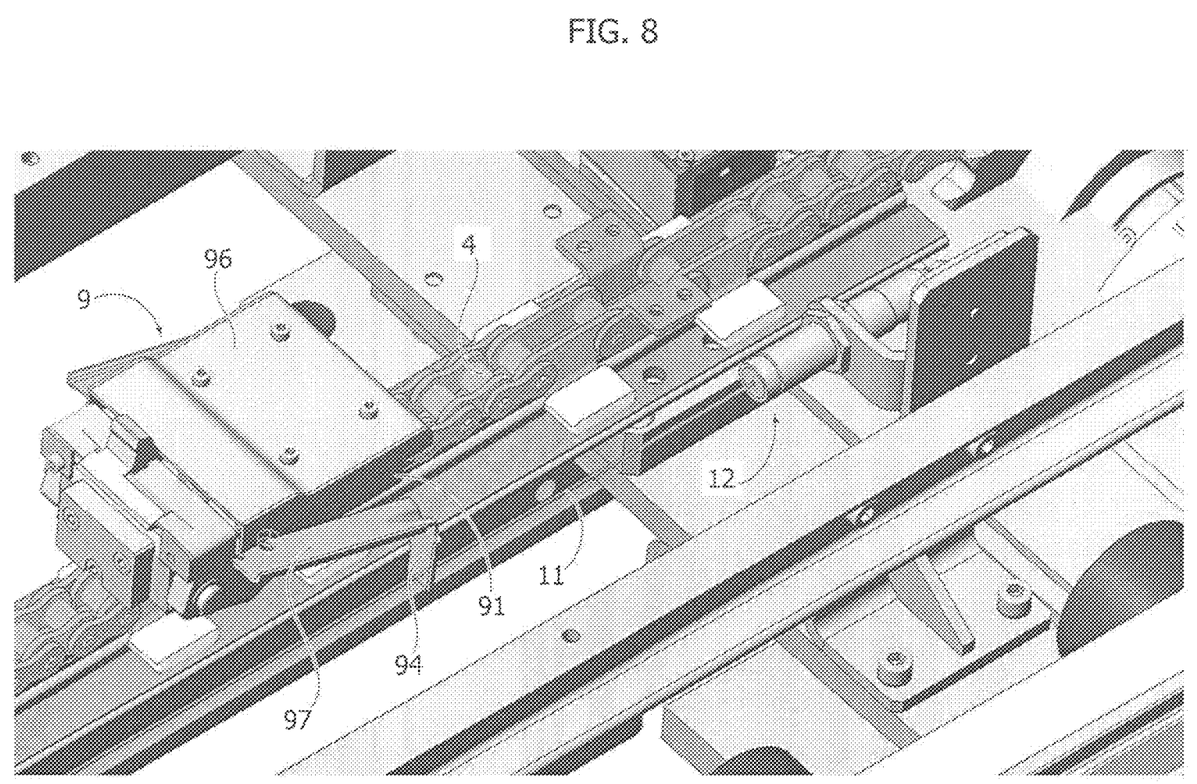
FIG. 8 is a perspective view of a hook unit in the operative configuration illustrated in FIG. 6B.

As illustrated in FIGS. 6B, 8, each rear hook unit 9 has also a first interception element 94 and a second interception element 95. The interception elements 94 and 95 are rectangular plates each carried by a respective arm 97 connected to the support structure 92 of the rear hook unit 9. The interception elements 94 and 95 are positioned on two opposite sides of the hook structure 91 and have their main surfaces vertically oriented and positioned onto respective outer sides of the chain 4. It is clearly to be understood that the specific structure of the rear end front hook units 9, 8 which has been described above is provided here merely as an example.

The chain conveyor device 3, as illustrated in FIGS. 6B, 8 comprises also a first optical sensor 12 and a second optical sensor (not illustrated in the drawings). The sensor 12 is constituted by an emitter 121 which emits an optical beam 11 and by a receiver 122 adapted to receive the optical beam emitted by the emitter. Also the second sensor is constituted by an emitter and by a receiver.

Both the sensors are in communication with an electronic unit E which is connected to, or incorporated in, the electronic control system 7 of the line 1.

With reference in particular to FIGS. 6B,8, an operative configuration of the rear hook unit 9 is illustrated which occurs as a consequence of a malfunction during assembling of the parts transported by the pallets 5. In particular, in the case in which an obstacle prevents an individual pallet 5 from proceeding along with the chain 4, the hook unit 9 which pushes the pallet 5 is subjected to a resisting force which opposes its movement. As a consequence of this condition, the hook 92 of this pallet 5 moves away from its engaging position against the action of spring 93 which tends instead to hold the hook 92 engaged on the respective pallet 5. As illustrated in FIGS. 6B, 8, the hook 92 rotates to an optical beam interception position as a consequence of the presence of the obstacle which prevents the movement of the pallet 5. In the interception position, the first interception element 94 intercepts the first optical beam 11 emitted by the emitter 121 of the first optical sensor 12. In this optical beam interception position, it also occurs that the second interception element 95 of the hook 92 intercepts a second optical beam emitted by the emitter of the second optical sensor (not shown).

The electronic control system 7 of the line 1 is programmed for generating a command signal when the first optical beam 11 of the first optical sensor 12 is intercepted by the first interception element 94 of one of the rear hook units 9. This command signal can be used to generate a visual and/or acoustic alarm signal, but more preferably it causes also, or only, a stop of the chain conveyor device 3.

Thanks to this feature, the production line according to the present invention provides adequate safety to the operators that interact with the production line. Furthermore when the optical beam emitted by the second optical sensor is intercepted by the second interception element 95, the electronic unit E of the line 1 is programmed for emitting a signal which is used by the control electronic system 7 for identifying the hook 92 which moves away from its engaging position. The electronic system 7 is thus configured for identifying on which pallet 5 a malfunction is caused by the presence of an obstacle preventing the movement of the specific pallet 5.

The electronic control system 7 of the line 1 comprises also an encoder (not illustrated) provided for controlling the position of the chain 4, and thus of the pallet 5 which is moving through the assembling station, and a second encoder (not illustrated) provided for the position control of each implement 10 along the bearing structure 101.

Thanks to the above features, the production line 1, with the continuously moving pallets 5, ensures quick and easy assembling operations, while being also adapted for checking proper execution of each cycle of assembling operations and ensuring a prompt intervention in case of any malfunction, in particular in the case of any obstacle or obstruction preventing movement of the pallets.

Furthermore, the production line 1 according to the invention provides highly ergonomic operations for the operators 9 and enables parts of different sizes to be assembled, while monitoring continuously the assembling status and thus the production level of the line 1.

The number of the assembling stations of the line 1 is variable according to the production requirements and according to the parts to be assembled which are transported by the pallets 5. Also thanks to this feature, the production line according to the invention results to be easy to be integrated in different sections of the layout of a production environment.

Naturally, while the principle of the invention remains the same, the details of construction and the embodiments may widely vary with respect to what has been described and illustrated purely by way of example, without departing from the scope of the present invention.

The invention claimed is:

1. A production line comprising:
    at least one assembling station;
    a chain conveyor device comprising a chain for transporting a plurality of pallets along a production line, wherein each pallet is operable for transporting parts to be assembled;
    a motor engaged to the chain for moving said chain;
    an electronic control system;
    said motor and said electronic control system operable to move said pallets with a continuous movement through said at least one assembling station;
    said production line being characterized in that:
    an implement associated to said at least one assembling station, wherein said implement is guided on a support structure in such a way as to be freely movable along a transport direction of the plurality of pallets, whereby said implement can be used by an operator positioned in proximity to the at least one assembling station in order to execute a manual assembly operation on the parts transported by each pallet, said implement operable to be pulled by the operator while the operator follows the respective pallet in its continuous movement through the assembling station, for executing said manual assembly operation;
    in association with each pallet, said chain further comprises a front hook unit and a rear hook unit which are longitudinally spaced from each other and operable to engage the pallet for locating the pallet relative to said chain and for moving the pallet to along with the chain;
    said rear hook unit operable to release the pallet when an obstacle prevents the pallet from moving along with the chain, said rear hook unit further operable to move, in this condition, to an optical beam interception position, in which a first interception element which is part of the rear hook unit intercepts a first optical beam emitted by a first optical sensor;

said electronic control system being programmed for generating a command signal when said first optical beam is intercepted by said first interception element.

2. The production line according to claim 1, wherein said command signal is operable to stop the chain conveyor device.

3. The production line according to claim 1, wherein an automatic assistance system to the operator is associated to one of the at least one assembling station, said automatic assisting system comprising a plurality of automated drawers operable to contain components to be used for the assembling of said parts transported by the respective pallets.

4. The production line according to claim 3, wherein each of said plurality of automated drawers is movable between a retracted position and a position advanced forwardly towards the operator, by an actuator controlled by said electronic control system and in that the electronic control system is programmed for moving the respective automated drawers of the at least one assembling station in sequence towards the forwardly advanced position, in synchronism with the movement of the respective pallet through the at least one assembling station.

5. The production line according to claim 4, wherein a human machine interface is positioned proximate to the at least one assembling station and supported in a position accessible by the operator during the manual assembly operation.

6. The production line according to claim 5, wherein said human-machine interface is operable to execute one or more of the following operations:
   indicating to the operator a correct sequence of the manual assembly operations to be executed on the parts transported by the respective pallets;
   confirming to the operator a correct execution of the executed manual assembly operation; or
   receiving an input by the operator respecting a correct execution of the manual assembly operation.

7. The production line according to claim 1, wherein said rear hook unit further comprises:
   a support bracket rigidly connected to an element of the chain;
   a hook pivotally mounted on the support bracket around an axis transverse to a transport direction of the chain along the production line;
   a spring operable to bias said rear hook unit hook towards a pallet engaging position,
   wherein when the obstacle prevents the pallet from proceeding along with the chain, said rear hook unit hook moves away from said pallet engaging position, against the bias of said spring, to said optical beam interception position.

8. The production line according to claim 7, wherein the rear hook unit comprises a second interception element which, in said interception position of the rear hook unit, is operable to intercept a second optical beam emitted by a second optical sensor having a signal, wherein the second optical sensor signal is used by the electronic control system for identifying a condition wherein the rear hook unit is positioned away from the pallet engaging position.

9. The production line according to claim 1, wherein the rear hook unit comprises a second interception element which, in said interception position of the rear hook unit, is operable to intercept a second optical beam emitted by a second optical sensor having a signal, wherein the second optical sensor signal is used by the electronic control system for identifying a condition wherein the rear hook unit is positioned away from the pallet engaging position.

10. The production line according to claim 1, wherein said implement is connected to a slide which is freely slidably mounted along a transport direction of the plurality of pallets on a bearing structure mounted adjacent to said chain conveyor device; said implement comprising a sequence of elements which are movably mounted one relative to each other, according to different degrees of freedom, wherein a last element of this sequence connected to a tool.

11. The production line according to claim 1 further comprising, a sensor connected to said electronic control system operable to sense a position of each of the plurality of pallets and the implement along a transport direction of the pallets along the production line.

12. The production line according to claim 1, wherein each of the at least one assembling station further comprises a plurality of data storing electronic units operable to store the manual assembly operation executed on each respective pallet.

* * * * *